United States Patent [19]

Takacs et al.

[11] 4,087,194
[45] May 2, 1978

[54] CUTTING TOOL
[75] Inventors: Victor C. Takacs; Joseph E. Takacs, both of Houston, Tex.
[73] Assignee: Triangle Grinding, Inc., Houston, Tex.
[21] Appl. No.: 787,333
[22] Filed: Apr. 14, 1977
[51] Int. Cl.² .................... B23B 51/00; B23B 31/10; B26D 1/12
[52] U.S. Cl. .................... 408/199; 408/239; 408/713; 407/66; 407/100; 407/101; 407/111
[58] Field of Search ............... 408/147, 239, 240, 199, 408/238, 226, 713; 407/100, 101, 102, 111, 66

[56] References Cited
U.S. PATENT DOCUMENTS

| 2,310,992 | 2/1943 | Proksa | 407/111 |
| 2,952,171 | 9/1960 | Breuning | 407/101 |
| 3,125,799 | 3/1964 | Bennett | 408/226 |
| 3,245,288 | 4/1966 | Fried | 407/111 |
| 3,250,154 | 5/1966 | Breuning | 408/199 |

Primary Examiner—Harrison L. Hinson
Attorney, Agent, or Firm—Bill B. Berryhill

[57] ABSTRACT

A cutting tool which may comprise: an elongated bar member having a body portion and an end portion; and an anvil member removably fastened to the end portion of the bar member for rigidly clamping a cutting insert to the bar member for radial projection therefrom. The end portion of the bar member and anvil member, when fastened together, may form a cylindroid which in at least some embodiments may have a central longitudinal axis which is parallel but offset from the central longitudinal axis of the bar member body portion.

25 Claims, 4 Drawing Figures

CUTTING TOOL

BACKGROUND OF THE INVENTION

1. Field of the Invention

The present invention pertains to cutting tools and in particular to tools for machining and finishing metal. More specifically, it pertains to tools especially adapted for internal threading and/or grooving of metal.

2. Brief Description of the Prior Art

Cutting tools for machining threads and grooves in metal have existed for many years. Tools for both external and internal machining are well known in the prior art. A common practice, for internal machining, is to fasten the part to be machined in a chuck or vise, to fasten a cutting tool in another chuck or vise of a machine and to rotate one of the chucks relative to the other. With many of such internal cutting tools, the tool includes an elongated bar at the end of which is attached, in some fashion, a replaceable cutting insert. When the cutting insert is broken or worn, it may be removed and replaced with a new or sharpened cutting insert without having to replace the more expensive bar.

Several of the cutting bars of the prior art are provided with an anvil having a recess or groove in which the cutting insert may be received and by which the cutting insert may be clamped between the anvil and the bar. In some of these tools, the anvil is integral with the bar, whereas, in the others, the anvil is a separate member which is removably fastened to the bar.

One of the major problems in internal machining is providing rigidity of the bar and cutting insert mounting. This is particularly a problem in internal threading or grooving of a machine part with a small internal diameter. In order to be received within a part of small internal diameter, the portion of the tool extending thereinto must of necessity have a small cross-section of reduced mass. Furthermore, with commonly used cylindrical bars and anvil mountings, the diameter of the bar must be reduced in order to allow room for radial projection of the cutting insert mounted thereto. This further reduces the mass of the bar and necessarily results in a bar of less rigidity. With reduced rigidity, chatter may occur, resulting in inferior machining and possible breakage of cutting inserts and anvils. Even if chatter does not occur, the bar may flex to such an extent that accurate machining is not obtained.

Another problem associated with internal machining is the inability to machine near the end of a counterbored hole. With the common prior art right-angle mounting of cutting inserts on the bar, the bar anvil or side of the cutting insert may prevent complete depth machining in the counterbore.

SUMMARY OF THE INVENTION

In the present invention, a cutting tool is provided which includes an elongated bar member having a body portion and an end portion and an anvil member removably fastened to the end portion of the bar member for rigidly clamping a cutting insert between the anvil member and bar member end portion for radial projection therefrom. The end portion of the bar member and the anvil member, when fastened together, preferably form a cylindroid having an elliptical cross-section, the major axis of which is perpendicular to the intended direction of radial projection of the cutting insert. This allows the major axis of the elliptical cross-section to terminate just short of the internal diameter of the part being machined. Yet, its minor axis may allow enough clearance between the anvil and bar for projection of the cutting insert. Therefore, additional mass is provided by the elliptical cross-section which would not be provided with the circular cross-sections of cylindrical bar and anvil members of the prior art, whose diameters must be at least twice the length of radial projection of the cutting insert, less the internal diameter of the part being machined. With the increased mass provided by the cylindroid shaped bar member end portion and anvil, the cutting tool of the present invention provides substantially more rigidity, reducing chatter and inferior machining.

In preferred embodiments, the axis of the cylindroid formed by the bar member end portion and anvil member, while being parallel to the central longitudinal axis of the bar member body portion, may be offset in a direction along the minor axis of the elliptical cross-section. This provides additional mass, allowing the minor diameter of the elliptical cross-section to be increased by approximately the length of radial projection of the cutting insert from the bar and anvil member. This further increase in cross-sectional area and mass of the cylindroid results in still further decrease in chatter and inaccurate machining due to flexing of the bar member.

Still another feature of the invention which provides increased rigidity and resultant accuracy of machining is the angular mounting of the cutting insert between the anvil member and bar member. An elongated recess in which the cutting insert may be disposed for radial projection from the tool, may be carried by either the anvil member or the end portion of the bar member. The axis of the elongated recess may be inclined, relative to the central axis of the bar member body portion and cylindroid, at an angle of somewhat less than ninety degrees. This permits the shank of the cutting insert to be longer, providing a firmer and more rigid mounting between the anvil and end portion of the bar member.

These major features and others to be described hereafter results in a more rigid and accurate machining tool with capabilities of internal machining of smaller diameter than with those of the prior art. The resulting machine work is more accurate and the tool and cutting insert held thereby is less susceptible to breakage and wear.

Several variations and features of the invention will be described hereafter. Many others will be apparent to those skilled in the art from reading the description which follows in conjunction with the accompanying drawings.

DESCRIPTION OF PREFERRED EMBODIMENTS

Figure 1:
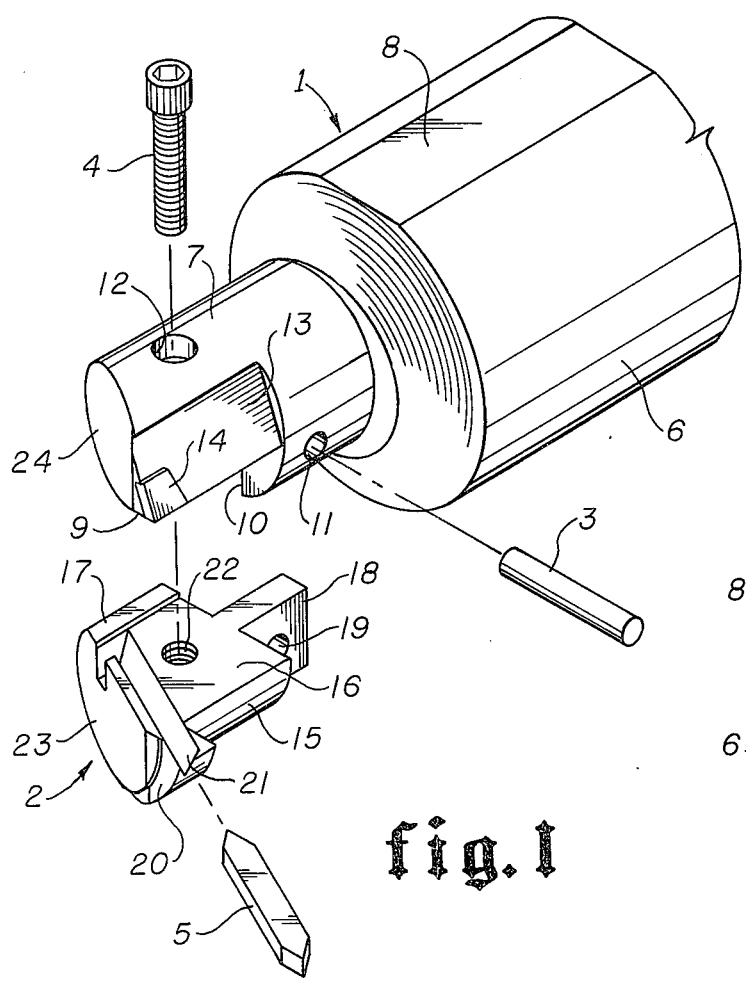
FIG. 1 is an exploded perspective view of a preferred embodiment of the invention.
Figure 2:
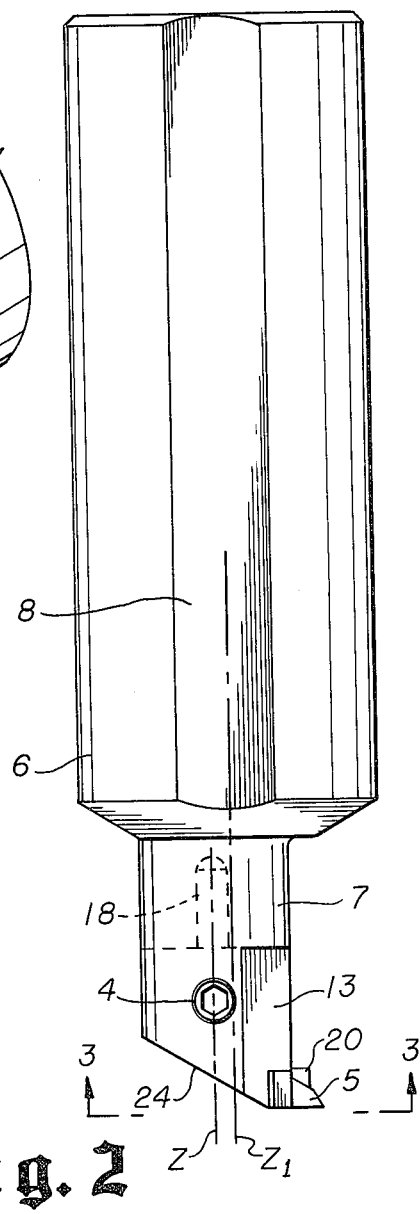
FIG. 2 is a top plan view of the embodiment of FIG. 1.
Figure 3:
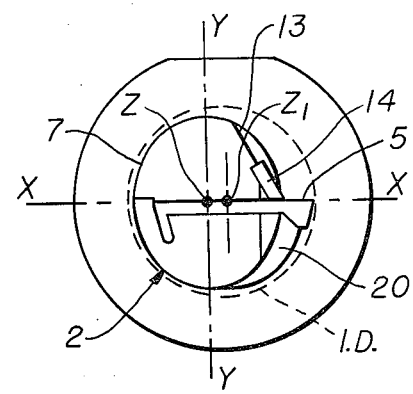
FIG. 3 is an end view of the embodiment of FIGS. 1 and 2, taken along line 3—3 of FIG. 2.

Referring first to FIGS. 1, 2, and 3, there is shown a cutting tool according to a preferred embodiment of the invention, having two major assemblies: an elongated bar member 1 and an anvil member 2. The tool also includes dowel pin 3, cap screw 4 and may include a cutting insert 5.

As shown, the bar member 1 is made up of a generally cylindrical body portion 6 and end portion 7 of smaller cross-section. The end portion 7 is of a special shape and axial disposition, to be more fully described hereafter. The body portion 6 may be provided with longitudinal flats 8 to aid in holding the bar member 1 in the chuck or vise of a machine. A longitudinal section is removed from end portion 7 leaving a flat face 9 against which the anvil member 2 presses upon assembly. Adjacent the removed section area, the end portion 7 may be provided with an elongated groove 10 for receiving the tongue portion of anvil member 2, as will be more fully understood hereafter. Transverse holes 11 are provided through the end portion 7 in the area of tongue groove 10. A countersunk hole 12 communicating with the face 9 may be provided for receiving cap screw 4.

The end portion 7 may be provided wqth a flat area 13 adjacent to face 9 and mounted in the flat area 13 may be a chip deflector 14. The chip deflector 14 is preferably made of a material substantially harder than the material of bar member 1, e.g. carbide. To affix the chip deflector 14 to the end portion 7, a relieved or recessed area is first machined and then the deflector placed and brazed therein. It will be noted that when the cutting tool is assembled, the chip deflector 14 will be in juxtaposed relationship with the cutting insert 6.

The anvil member 2 may include a body portion 15 correlatively shaped with the end portion 7 of the bar member 1 and having a flat face 16 and raised ridge 17 to press against the flat face 9 of bar member end portion 7. Extending from the body portion 15 of anvil member 2 is a tongue portion 18 through which is a transverse hole 19. The tongue 18 and hole 19, when assembled with a bar member 1, will engage the groove 10 and line up with holes 11, respectively.

Projecting somewhat radially over approximately eighty to ninety degrees of the periphery of anvil member 15 is a radial rib portion 20. Provided in the flat face 16 and rib 20 of anvil member 2 is an elongated recess or groove 21 in which may be received the cutting insert 5 so that the cutting insert would project generally radially from the bar member 1. A preferred configuration for the groove 21 is a V-shaped cross section. It will be noted that the groove 21 and cutting insert 5 when installed therein are disposed at an angle relative to the axis of bar member 1. This feature will be further discussed hereafter.

On initial assembly, anvil 2 is attached to bar 1 by placing the tongue portion within tongue groove 10 so that the transverse holes 11 and 19 are coaxially aligned. Then the dowel pin 3 is inserted in these holes. The tongue 18 and groove 10 are so machined that there is a slight clearance between the downwardly facing bottom of groove 10 and the upward flat surface of the tongue 18. This permits at least some limited pivoting of the anvil 2 about the axis of pin 3 so as to allow easy insertion of the cutting insert 5 within the anvil groove 21. After the cutting insert 5 is placed in groove 21, cap screw 4 is inserted through hole 12 for engagement with the threaded hole 22 of the anvil member 2. Tightening of the cap screw 4 draws the anvil ridge 17 tightly against the downwardly facing flat surface 9 of end portion 7 and firmly clamps the cutting insert 5 between the anvil member 2 and bar member end portion 7. To remove the cutting insert 5 for replacement or reconditioning, the cap screw 4 may be loosened to the extent necessary to slip the cutting insert out of groove 21 and to slip another therein.

Referring now particularly to FIGS. 2 and 3, the shape and disposition of the end portion 7 and anvil member 2 will be more fully set out. When assembled, the end portion 7 and anvil member 2 form a cylindroid having an elliptical cross section whose major axis is designated Y—Y and whose minor axis is designated X—X. It will also be noticed that the central longitudinal axis Z of the cylindroid is slightly offset from the longitudinal axis $Z_1$ of the bar member body portion 6. It can be understood that the length of the major axis Y—Y of the elliptical cross section can be almost as great as the internal diameter of the part being machined by the tool. The minor axis X—X must be short enough to allow, between the surface of the cylindroid and the internal surface of the part being machined by the tool, enough space for projecting of the cutting insert 5.

If the central axis Z of the cylindroid were coincidental with the central axis $Z_1$ of the bar body portion 6, the same amount of space would be required on each side of the cylindroid at the minor axis. This would, of course, reduce the minor axis for a particular part internal diameter and would of course reduce the mass and rigidity of the cylindroid. However, as shown, if the central axis Z of the cylindroid is offset from the central axis $Z_1$ of the body portion 6, in a direction opposite that of cutting insert projection, almost no space is required between the offset side of the cylindroid and the internal surface of the part being machined by the tool. This results in an increase in the minor axis dimension of approximately the amount of radial projection of cutting insert 5 or the radial width of radial support rib 20. To provide a concept of the relationship of the cylindroid cross section to the internal diameter of the part being machined thereby, the internal diameter of the part is shown in FIG. 3 as a dotted line referenced ID.

Figure 4:
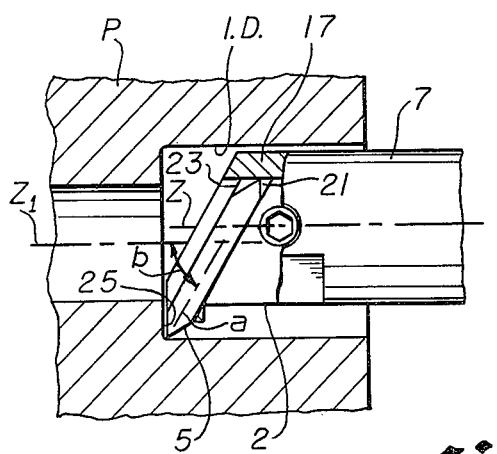
FIG. 4 is a detail, partially in section, illustrating the use of a cutting tool according to a preferred embodiment of the invention in internally machining a counterbored machine part.

To more fully understand the offset relationship of the cylindroid formed by end portion and anvil member 2, reference is now made also to FIG. 4. Here a machine part P is shown being internally machined in a counterbore ID. The axis of the counterbore ID is coincidental with the axis $Z_1$ of the bar member body portion 6. The axis Z of the cylindroid formed by the end portion and anvil member 2 is offset as previously described with reference to FIGS. 2 and 3. As previously mentioned, the cutting insert 5 is mounted in groove 21 of the anvil member 2. The longitudinal axis a of the insert 5 in groove 21 is inclined relative to axes Z and $Z_1$ at an angle b, somewhat less than 90°. This permits the shank of the cutting insert 5 and the recess 21 to be longer than they would be if disposed at right angles to the axes Z and $Z_1$. Consequently, the cutting insert 5 can be more securely and rigidly clamped, resulting in less chatter and more accurate machining. It will also be noted that the ends 23 and 24 of anvil member 2 and bar member end portion 7, respectively, are machined off in a plane parallel to the inclined axis a. This feature along with the inclined mounting of insert 5 permits the cutting insert 5 to cut completely to the shoulder 25 of counterbore ID which would not be possible in tools in which the cutting insert is mounted at right angles to the longitudinal axis of the bar member.

Thus, the cutting tool of the present invention has at least three major and unique characteristics which increases its rigidity: a cylindroid shape, an offset longitudinal axis, and inclined mounting of cutting inserts. These features, in combination with the other characteristics of the cutting tool of the present invention, make it far superior to small diameter internal cutting tools of the prior art. Its rigidity, extended bar anvil and cutting insert life, superior clamping and easy cutting insert replacement render the tool highly desirable for its intended applications. Most importantly, such characteristics and capabilities result in superior work.

Although several embodiments of the invention have been described herein, many variations can be made without departing from the spirit of the invention. Therefore, it is intended that the scope of the invention be limited only by the claims which follow.

We claim:

1. A cutting tool comprising:
   an elongated bar member; and
   an anvil member removably fastened to one end of said bar member for rigidily clamping a cutting insert to said bar member for radial projection therefrom;
   said one end of said bar member and said anvil member forming a cylindroid the elliptical cross section of which has a major axis substantially perpendicular to said radial projection of said cutting insert.

2. A cutting tool as set forth in claim 1 in which the longitudinal axis of said cylindroid is offset from the longitudinal axis of the adjacent portion of said bar member.

3. A cutting tool as set forth in claim 2 in which the portion of said bar member adjacent said one end is substantially cylindrical, the diameter of said cylindrical portion being at least as great as the major axis of said elliptical cross section of said cylindroid.

4. A cutting tool as set forth in claim 2 in combination with a cutting insert clamped between said anvil and bar members, the shortest distance from the projection of said longitudinal axis of said adjacent portion of said bar member to the farthest projection of said cutting insert being at least as great as one-half of the major axis of said elliptical cross section of said cylindroid.

5. A cutting tool as set forth in claim 4 in which said cutting insert comprises an elongated shank at the end of which is a cutting tip, said anvil member including a groove in which said cutting insert is disposed so that the axis of said shank is inclined at an angle of less than ninety degrees relative to the said longitudinal axis of said adjacent portion of said bar member.

6. A cutting tool as set forth in claim 5 in which the upper face of said cutting tip is triangular in shape, one side of said triangular tip being substantially perpendicular to said longitudinal axis of said adjacent portion of said bar member.

7. A cutting tool as set forth in claim 1 in which said anvil member is provided with an elongated recess in which a cutting insert may be disposed for said clamping and radial projection from said one end of said bar member.

8. A cutting tool as set forth in claim 7 in which the longitudinal axis of said recess is inclined, relative to the longitudinal axis of said bar member, at an angle of less than 90°.

9. A cutting tool as set forth in claim 7 in which said anvil member is provided with a radial support rib for supporting the cutting insert to be disposed in said angle member recess.

10. A cutting tool as set forth in claim 9 in which the length of the minor axis of said elliptical cross section plus the radial width of said support rib is no greater than said major axis of said elliptical cross section.

11. A cutting tool as set forth in claim 7 in which said one end of said bar member is provided with a chip deflector of harder material than said bar member for juxtaposed relationship with the cutting insert to be disposed in said anvil recess.

12. A cutting tool comprising:
    an elongated bar member having a body portion and an end portion of smaller cross section, the longitudinal axis of said end portion being offset from the longitudinal axis of said body portion; and
    an anvil member removably fastened to said end portion of said bar member for rigidly clamping a cutting insert to said bar member for radial projection therefrom.

13. A cutting tool as set forth in claim 12 in which said anvil member is provided with an elongated recess in which a cutting insert may be disposed for said clamping and radial projection from the said end portion of said bar member in a direction opposite the direction from which said end portion axis is offset from said body portion axis.

14. A cutting tool as set forth in claim 13 in which the longitudinal axis of said recess is inclined, relative to said body portion axis, at an angle of less than 90°.

15. A cutting tool as set forth in claim 14 in which said anvil member is provided with a radial support rib for supporting at least a portion of the cutting insert to be disposed in said elongated recess.

16. A cutting tool as set forth in claim 15 in which said end portion of said bar member is provided with a chip deflector of substantially harder material than said bar member for juxtaposed relationship with said cutting insert.

17. A cutting tool as set forth in claim 14 in which said end portion of said bar member and said anvil member form a cylindroid, the elliptical cross section of which has a major axis substantially perpendicular to said axis of said anvil recess.

18. A cutting tool as set forth in claim 17 in which said anvil member is provided with a radial support rib for supporting the cutting insert to be disposed in said anvil member recess.

19. A cutting tool as set forth in claim 18 in which the length of the minor axis of said elliptical cross section plus the radial width of said support rib is no greater than said major axis of said elliptical cross section.

20. A cutting tool as set forth in claim 19 in which said bar member body portion is cylindrical and of a diameter greater than said major axis of said cylindroid cross section.

21. A cutting tool comprising:
    an elongated bar member having a body portion and an end portion; and
    an anvil member removably fastened to said end portion of said bar member for rigidly clamping a cutting insert between said anvil member and bar member end portion for radial projection therefrom;
    said end portion of said bar member and said anvil member forming a cylindroid the central longitudinal axis of which is parallel to but offset from the central longitudinal axis of said bar member body portion.

22. A cutting tool as set forth in claim 21 including an elongated recess carried by one of said anvil member and said end portion of said bar member in which said cutting insert may be disposed for said radial projection therefrom.

23. A cutting tool as set forth in claim 22 in which the axis of said elongated recess is inclined, relative to the central axes of said bar member body portion and said cylindroid, at an angle of less than 90°.

24. A cutting tool as set forth in claim 22 in which said anvil member is provided with a radial support rib for juxtaposed relationship with said elongated recess, the radial width of said support rib plus the length of the minor axis of the elliptical cross section of said cylindroid being no greater than the length of the major axis of said elliptical cross section.

25. A cutting tool as set forth in claim 21 in which said anvil and bar members are provided with cooperating and mutually engageable tongue and groove means by which said anvil member may be fastened to said bar member.

* * * * *